US008483261B2

(12) United States Patent
Seo et al.

(10) Patent No.: US 8,483,261 B2
(45) Date of Patent: Jul. 9, 2013

(54) APPARATUS AND METHOD FOR CONTROLLING UNIVERSAL IC CARD IN COMPLEX TERMINAL

(75) Inventors: Han-Shin Seo, Seoul (KR); Jin-Won Seo, Seoul (KR); Jeong-Eun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 12/589,673

(22) Filed: Oct. 27, 2009

(65) Prior Publication Data

US 2010/0103995 A1 Apr. 29, 2010

(30) Foreign Application Priority Data

Oct. 27, 2008 (KR) ........................ 10-2008-0105141

(51) Int. Cl.
H04B 1/38 (2006.01)
(52) U.S. Cl.
USPC .......................................... 375/222

(58) Field of Classification Search
USPC .................. 375/222; 455/552.1, 558; 379/357
See application file for complete search history.

(56) References Cited

U.S. PATENT DOCUMENTS

| 6,141,564 | A | 10/2000 | Bruner et al. | |
|---|---|---|---|---|
| 8,160,645 | B2* | 4/2012 | Lee et al. | 455/558 |
| 2005/0135348 | A1* | 6/2005 | Staack | 370/353 |
| 2008/0181287 | A1* | 7/2008 | Rofougaran | 375/222 |
| 2008/0293394 | A1* | 11/2008 | Silver et al. | 455/417 |

* cited by examiner

Primary Examiner — Don N Vo

(57) ABSTRACT

A complex terminal includes an apparatus for controlling a Universal IC Card (UICC). The apparatus is configured to obtain a control information through a UICC initialization and provide a corresponding communication modem with the control information. A communication modem can request a communication authority based on the control information and obtain the communication authority from a controller. A selector can connect the corresponding communication modem to the UICC while the controller provides the corresponding communication modem with the communication authority.

36 Claims, 6 Drawing Sheets

APPARATUS AND METHOD FOR CONTROLLING UNIVERSAL IC CARD IN COMPLEX TERMINAL

CROSS-REFERENCE TO RELATED APPLICATION(S) AND CLAIM OF PRIORITY

The present application is related to and claims the benefit of priority under 35 U.S.C. §119 to an application filed in the Korean Intellectual Property Office on Oct. 27, 2008 and assigned Serial No. 10-2008-0105141, the contents of which are incorporated herein by reference.

TECHNICAL FIELD OF THE INVENTION

The present invention relates generally to a Universal IC Card (UICC) of a complex terminal, and more particularly, to an apparatus and a method for controlling the UICC to improve a power efficiency in a complex terminal which supports a plurality of communication systems.

BACKGROUND OF THE INVENTION

As a mobile communication network develops, a plurality of communication systems, such as Global System for Mobile Communication (GSM), Code Division Multiple Access (CDMA), Wideband Code Division Multiple Access (WCDMA), and Worldwide Interoperability for Microwave Access (WiMAX) based on IEEE 802.16 standard, exist together in a single terminal. A single terminal supports the plurality of communication systems using multiple communication modules (ex. modems) employed in the single terminal. The single terminal that supports the plurality of communication systems is called a complex terminal.

Meanwhile, after the complex terminal, including a built-in Universal IC Card (UICC), completes a process for subscriber identification, the complex terminal may use a service to access to a corresponding communication system. Conventionally, techniques for controlling the UICC are divided into a method using multiplexing (MUX) and a method not using MUX.

The method not using MUX defines a master UICC reader controlling the UICC physically, referred to as a master modem. That is, when a slave UICC reader (as called a slave modem) accesses to the UICC, the master modem replaces the slave modem as a UICC reader (referred to as an "instruction"). The master modem, receiving the instruction, transmits and receives commands or responses for communicating with a UICC instead of the slave modem. The master modem forwards the response received from the UICC, to the slave mode.

In the method using MUX, a variety of UICC readers share signals for communicating with the UICC As described above, the mater modem should communicate with the UICC instead of the slave modem in the method not using MUX. Generally, the complex terminal operates only one modem of a plurality of modems and keeps other modems in an idle mode for using a power effectively, except a handover and a roaming. However, when the slave modem has to communicate with the UICC, the master modem on idle mode awakes and has to communicate with the UICC instead of the slave modem. Therefore, the master modem consumes the power until the slave modem ends communications with the UICC.

In the method using MUX, whenever an active communication modem is changed, a connection to the UICC is changed and power consumption is saved. After a first communication modem is connected to the UICC, Cold Reset should be performed so that a second communication modem is newly connected to the UICC. For this, it is difficult for the complex terminal to keep the connection between the first communication modem and the UICC and control the connection between the second communication modem and the UICC.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for controlling a Universal IC Card (UICC) in a complex terminal.

Another aspect of the present invention is to provide an apparatus and a method for maintaining a connection between each communication modem and a UICC and sharing the UICC in a complex terminal.

A further aspect of the present invention is to provide an apparatus and a method for controlling a UICC using MUX to save a power effectively.

In accordance with an aspect of the present invention, a method for communicating with a Universal IC Card (UICC) in portable terminal having at least two communication modems is provided. The method includes obtaining, by a controller, a control information through a UICC initialization and providing a corresponding communication modem with the control information, requesting, by the corresponding communication modem, a communication authority based on the control information and obtaining the communication authority from the controller; and connecting, by a selector, the corresponding communication modem to the UICC, while the controller provides the corresponding communication modem with the communication authority.

In accordance with another aspect of the present invention, an apparatus for communicating with a Universal IC Card (UICC) in portable terminal that includes at least two communication modems is provided. The apparatus includes a controller for obtaining a control information through a UICC initialization and providing a corresponding communication modem with the control information, the corresponding communication modem for requesting a communication authority based on the control information and obtaining the communication authority from the controller, and a selector connecting the corresponding communication modem to the UICC while the controller provides the corresponding communication modem with the communication authority.

In accordance with yet another aspect of the present invention, an apparatus for controlling a Universal IC Card (UICC) in portable terminal that includes at least two communication modems is provided. The apparatus includes an interface unit configured to communicate between at least two communication modems and a controller configured to control communication between the at least two communication modems and a UICC through a selector by giving and taking a communication authority to the at least two communication modems.

In accordance with still yet another aspect of the present invention, a method for controlling a Universal IC Card (UICC) in portable terminal that includes at least two communication modems is provided. The method includes receiving, by a controller, a request message for a communication authority from at least two communication modems, transmitting, by the controller, the communication authority to the at least two communication modems, and controlling, by the controller, a communication between the at least two communication modems and a UICC through a selector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain exemplary embodiments of the present invention will be more apparent from the following description taken in conjunction with the accompanying drawings in which.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide an apparatus and a method for controlling a Universal IC Card (UICC) in a complex terminal. As described below, examples of the complex terminal controlling between two communication modems and a UICC are given. However, the present invention may apply to the complex terminal controlling between two or more communication modems and a UICC.

Figure 1:
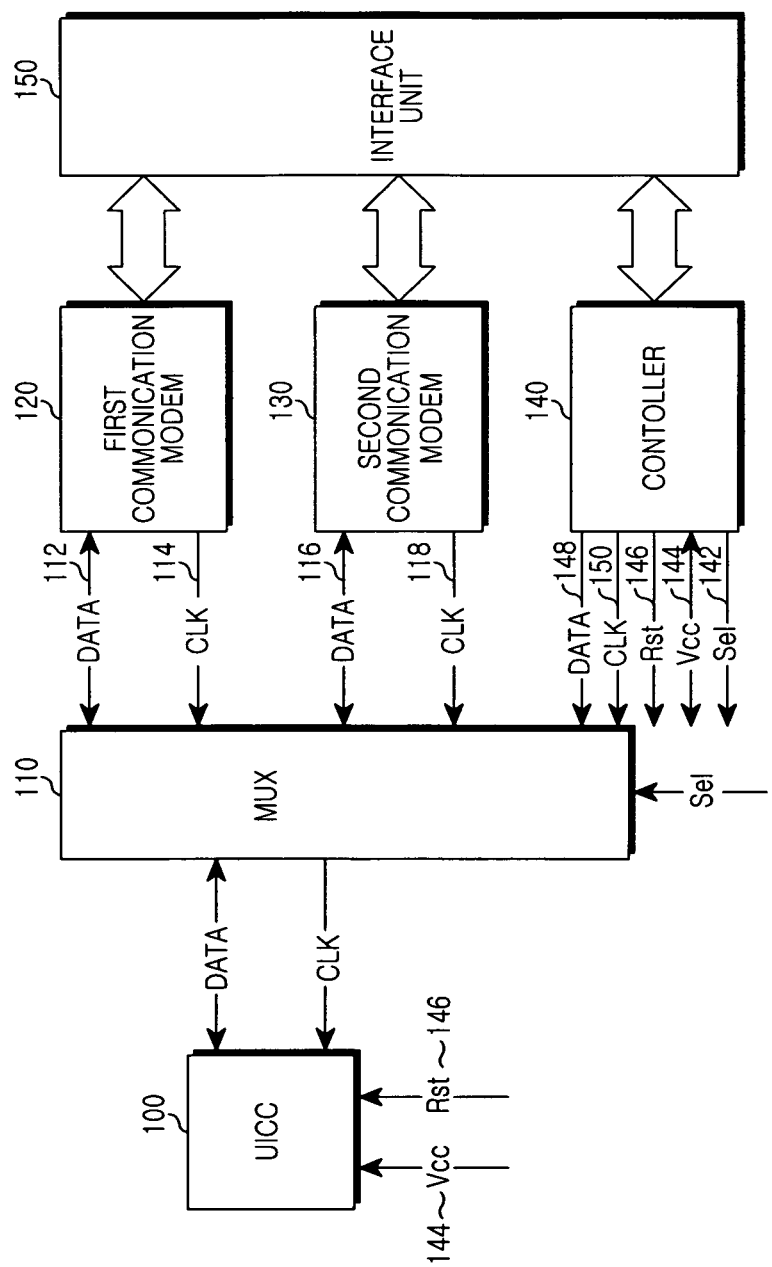
FIG. 1 illustrates a block diagram of controlling a UICC in a complex terminal according to an exemplary embodiment of the present invention.

FIG. 1 illustrates a block diagram of controlling a UICC in a complex terminal according to an exemplary embodiment of the present invention.

Referring to FIG. 1, UICC 100 includes a smart card supporting ISO7816-3 standard. The UICC 100 stores user information and a service operator information. The UICC 100 transmits and receives data in connection with either a first communication modem 120 or a second communication modem 130 through a MUX 110.

When the UICC 100 supports a Global System for Mobile communication (GSM), the UICC 100 can be referred to as Subscriber Identify Module (SIM) card. When the UICC 100 supports Wideband Code Division Multiple Access (WCDMA), the UICC 100 can be referred to as Universal Subscriber Identity Module (USIM). Therefore, in a mobile terminal that includes a built-in UICC 100, user authentication is performed automatically using information stored in the UICC 100 and the user conveniently uses the mobile terminal.

When the user replaces an old terminal with a new terminal, the user removes the UICC 100 from the old terminal and puts the UICC 100 in the new terminal. Therefore, the user may use the new terminal conveniently.

The first communication modem 120 and the second communication mode 130 each include a UICC reader built-in, and transmits and receives data using a corresponding mobile communication protocol. For example, the first communication modem 120 modulates and demodulates data for GSM and the second communication mode 130 modulates and demodulates data for WCDMA.

If a complex terminal powers on, either the first communication modem 120 or the second communication mode 130 operates to provide a service using a corresponding communication system. If the first communication modem 120 is activated, the second communication modem 130 is deactivated. That is, the second communication modem 130 can operate in an idle mode. Alternatively, if the second communication modem 130 is activated, the first communication modem 120 is deactivated.

Either the first communication modem 120 or the second communication modem 130 requests an Answer To Reset (ATR) information and a Protocol and Parameter Selection (PPS) information from a controller 140. Then, the first communication modem 120 or the second communication modem 130 receive the ATR and the PPS information from the controller 140. Then, the first communication modem 120 or the second communication modem 130 communicates data with the UICC 100 using the ATR and the PPS information. The communication modem 120, 130 requests or returns a communication authority to the controller 140 and informs the controller 140 of a communication end after completing a communication with the UICC 100.

The controller 140 controls a communication between the communication modem 120, 130 and the UICC 100 without conflicting between UICC readers. For this, the controller 140 can connect to the UICC 100 through clock port 150, data port 148, Vcc port 144 and Reset port 146. Therefore the controller 140 has a unique right to initialize the UICC 100. The UICC 100 connects to the MUX 110 through data port 112 and clock port 114 and the MUX connects to the first communication modem 120 through data port 112 and clock port 114. Similarly, the MUX 110 connects to the second communication modem 130 through data port 116 and clock port 118.

The controller 140 and the communication modem 120, 130 can independently exist with each other. According to an exemplary embodiment, one of the first communication modem 120 and the second communication modem 130 can include the controller 140.

The communication modems 120, 130 communicate with the UICC under control of the controller. A communication order between the UICC and the communication modems is dependent on a predetermined priority order or requesting order of the communication modems for the controller. The communication modems 120, 130 can withdraw requesting a communication authority before the communication authority is endued to the communication modem 120, 130.

The controller 140 has a unique right to initiate the UICC (100) physically. Therefore, when the communication modem 120, 130 requests an initializing of the UICC 100, the controller 140 can determine whether to accept the request to initialize the UICC 100 or not. However, ATR, PPT, voltage information can be regularly supplied to the communication modem 120, 130 to communicate with the UICC 100.

An interface unit 150 sends data for negotiating the communication authority between a communication modem 120, 130 and the controller 140.

The MUX 110 relays signals between the UICC 100 and a communication modem 120, 130 being endued a communication authority under controls of the controller 140.

Figure 2:
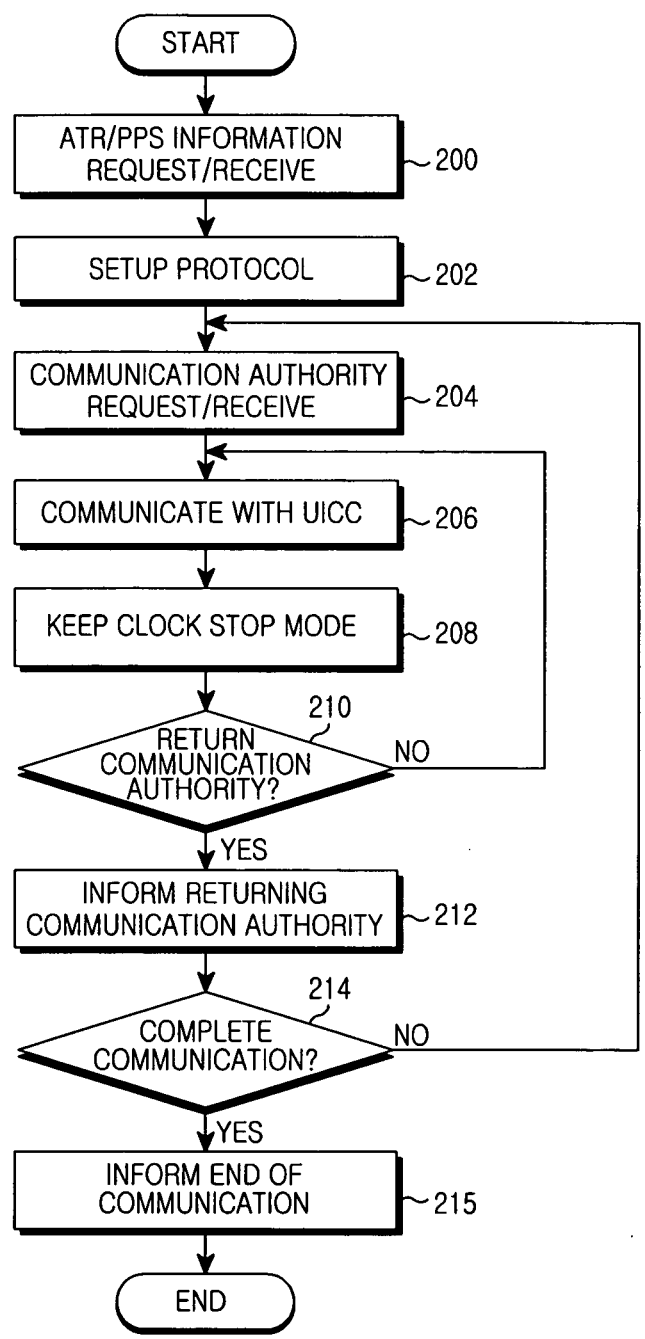
FIG. 2 illustrates a flowchart diagram of controlling a UICC in a complex terminal according to an exemplary embodiment of the present invention.

FIG. 2 illustrates a flowchart diagram of controlling a UICC in a complex terminal according to an exemplary embodiment of the present invention.

Referring to FIG. 2, in step 200, a communication modem 120, 130 requests ATR/PPS information from the controller 140 and receives the ATR/PPS information from the controller 140 to communicate with the UICC 100.

In step 202, the communication modem 120, 130 sets up protocol using the ATR/PPS information. Steps 200, 202 can be referred to as an initialization procedure, the initialization procedure will be illustrated in FIG. 3.

In step 204, the communication modem 120, 130 requests and receives a communication authority from the controller 140. A procedure for requesting a communication authority will be illustrated in FIG. 4.

In prior art, as the communication modem 120, 130 needs protocol information to communicate with the UICC 100. The communication modem 120, 130 should reset the UICC 100 to perform ATR and PPS. If any communication modem resets the UICC 100 to communicate with the UICC 100 in a complex terminal, a pre-connection between another communication modem and the UICC 100 may be broken.

Therefore, if the first communication modem 120 is to be connected to the UICC 100 through MUX 110 while the second communication modem 130 is connected to the UICC, the UICC 100 is maintained to be a clock stop mode to keep a steady state.

Here, the controller 140 can receive an ATR/PPS information request message and a communication authority request message from communication modem. The controller 140 informs an ATR/PPS information message and a communication authority message to a corresponding communication modem 120 or 130.

In step 206, the communication modem 120, 130 performs a communication with the UICC 100 under control of the controller 140.

In step 208, the communication modem 120, 130 and the UICC 100 should keep a clock stop mode, before returning the communication authority.

In step 210, when returning the communication authority after the communication modem 120, 130 completes communicating with the UICC 100, the communication modem 120, 130 informs the controller 140 to return the communication authority, in step 212. A procedure for returning the communication authority will be illustrated in FIG. 5.

In step 214, when a communication between the communication modem 120, 130 and the UICC 100 ends, the communication modem 120, 130 informs the controller 140 to end communication with the UICC 100, in step 215. An end procedure will be illustrated in FIG. 6.

Figure 3:
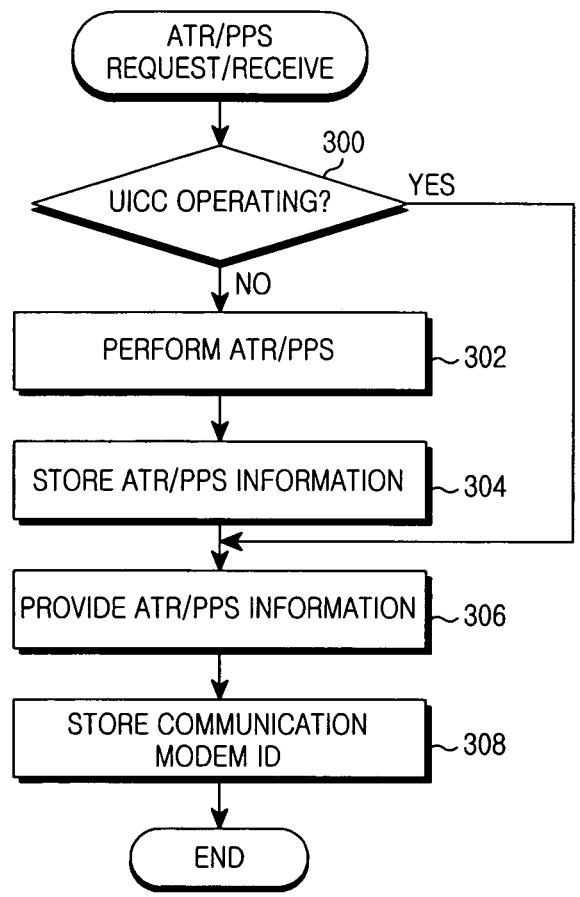
FIG. 3 illustrates an initialization procedure of controlling a UICC in a complex terminal according to an exemplary embodiment of the present invention.

FIG. 3 illustrates an initialization procedure for controlling a UICC in a complex terminal according to an exemplary embodiment of the present invention. The communication modem 120, 130 may not initiate the UICC 100 directly because a Vcc signal and Reset signal is not connected between the communication modem 120, 130 and the UICC 100.

Referring to FIG. 3, in step 300, a communication modem 120, 130 requests ATR and/or PPS from the controller 140. The controller 140 determines whether the UICC 100 operates or not, in step 300. If the UICC 100 does not operate (that is, before cold/warm reset is performed), the controller 140 performs ATR/PPS and activates the UICC 100, in step 302. In step 304, the controller 140 stores information for performing ATR/PPS from the UICC 304.

In step 306, the controller 140 provides the communication modem 120, 130 with ATR/PPS information. The ATR/PPS information is obtained by cold/warm reset.

In step 308, the controller 140 stores an identifier of the communication modem that requests an initialization of the UICC 100.

The controller 140 waits for a request/notice of a communication authority.

Alternatively, if the UICC 100 is operating (that is, Cold/Warm Reset was performed) in step 300, the controller 140 provides the communication modem 120, 130 with the stored ATR/PPS information in step 306.

Therefore, as the controller 140 controls storing/removing of an identifier of the communication modem 120, 130 that requests the initialization of the UICC 100. The UICC 100 may not require initialization every time.

Figure 4:
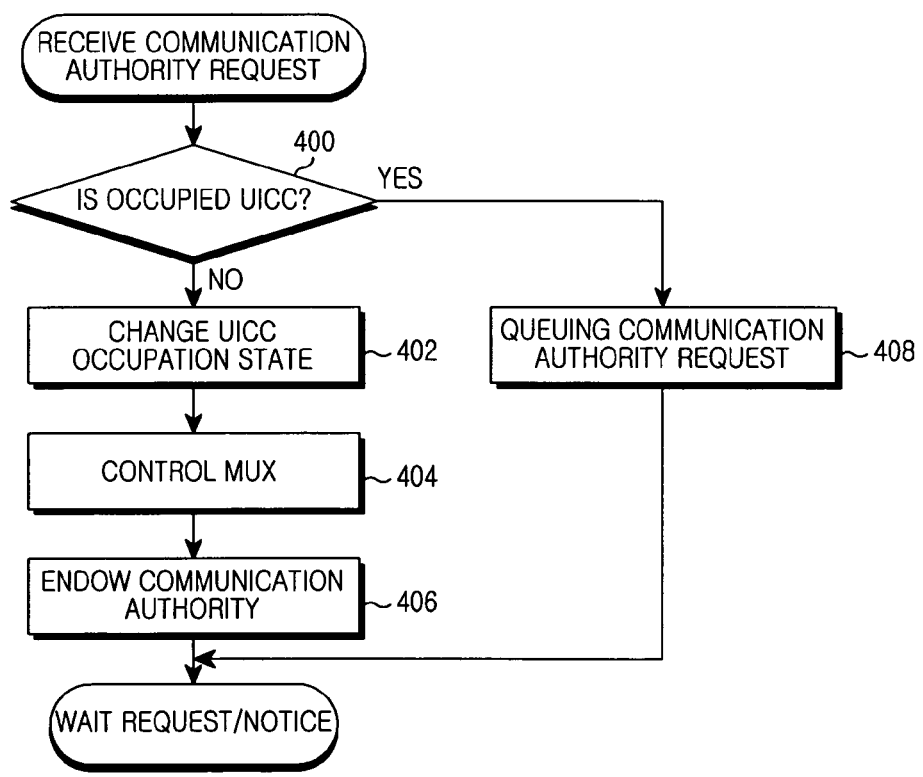
FIG. 4 illustrates a procedure for requesting a communication authority of controlling a UICC in a complex terminal according to an exemplary embodiment of the present invention.

FIG. 4 illustrates a procedure for requesting a communication authority of controlling a UICC in a complex terminal according to an exemplary embodiment of the present invention.

Referring to FIG. 4, the communication modem 120, 130 can obtain the required protocol information from the controller 140, after the initialization procedure. When the communication modem 120, 130 requests the communication authority to communicate with the UICC 100 to the controller 140, the controller 140 determines whether the UICC 100 is occupied by the communication modem 120, 130 in step 400.

If the UICC 100 is not connected to the communication modem 120, 130, an UICC occupation state is transitioned from "no occupation" to an "occupation" in step 402.

In step 404, the controller 140 controls to connect the communication modem 120, 130 requesting the communication authority to the UICC 100 using data signal and clock path, by controlling the MUX 110.

In step 406, the controller 140 endows a corresponding communication modem 120, 130 with the communication authority, if the corresponding communication modem 120, 130 and the UICC 100 are connected through the MUX 110 using a data path and a clock path. Additionally, the controller 140 informs the corresponding communication modem 120, 130 of being endowed the communication authority.

Alternatively, when the UICC 100 is connected to the first communication modem 120, if the second communication modem 130 requests a communication authority, the controller 140 provides the communication authority to the second communication modem 130 after the first communication modem 120 returns the communication authority to the controller.

In the embodiment, the communication modem 120, 130 can cancel the communication authority request in queue, before the controller 140 endows the communication modem 120, 130 with the communication authority. In another embodiment, the controller 140 removes the communication authority request in queue.

Figure 5:
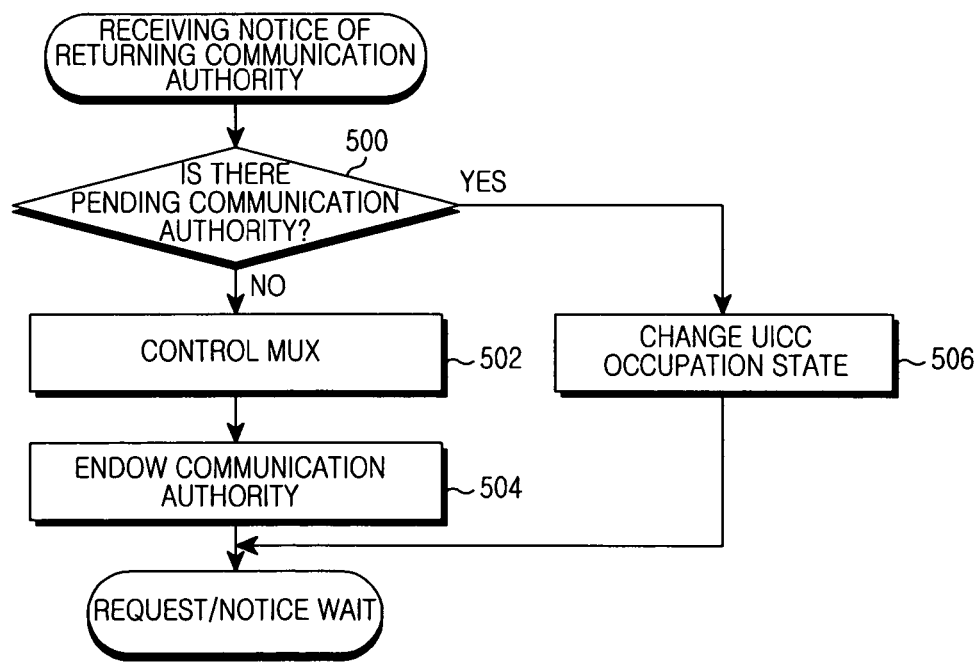
FIG. 5 illustrates a procedure for returning a communication authority of controlling a UICC in a complex terminal according to an exemplary embodiment of the present invention.

FIG. 5 illustrates a procedure for returning a communication authority of controlling a UICC in a complex terminal according to an exemplary embodiment of the present invention. In the FIG. 4, the communication modem 120, 130 to be endowed the communication authority can possess an exclusive communication authority to communicate with the UICC 100. Therefore, when a chapter of operation is finished, another communication modem may possess the communication authority which is returned to the controller 140.

Referring to FIG. 5, before a communication authority is returned to the controller 140, the controller 140 keeps the UICC 100 in a clock stop state and prevents swing data signal and clock signal. If the second communication modem 130 requests the communication authority to the controller 140 in step 500 while the controller 140 is informed returning the communication authority by the first communication modem 120, the controller 140 controls to connect the second communication modem 130 and the UICC 100 through the MUX 110 using data path and clock path in step 502.

In step 504, the controller 140 provides the second communication modem 130 with the communication authority. That is, the controller 140 informs that the communication authority is provided with the second communication modem 130.

If the second communication modem 130 does not request the communication authority from the controller 140 in step 500 while the controller 140 is informed returning the communication authority by the first communication modem 120, the controller 140 sets UICC occupation state as unoccupied state. In other words, UICC occupation state is transitioned from "occupation" to "no occupation".

Figure 6:
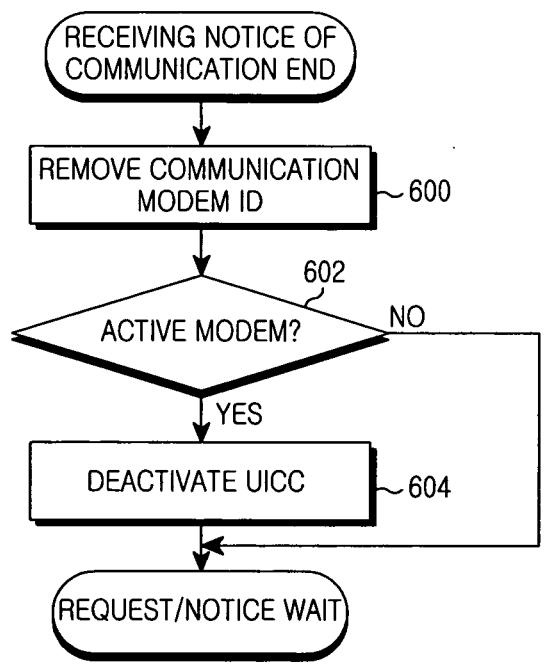
FIG. 6 illustrates a procedure for ending communication between a UICC and a communication modem in a complex terminal according to an exemplary embodiment of the present invention.

FIG. 6 illustrates a procedure for a communication end between a UICC and a communication modem in a complex terminal according to an exemplary embodiment of the present invention.

Referring to FIG. 6, the communication modem 120, 130 that does not have to communicate with the UICC 100 informs a communication end of the controller 140.

In step 600, the controller 140 recognizes that a corresponding communication modem 120, 130 does not desire to communicate with the UICC 100 any longer and removes the identifier of the corresponding communication modem that requests the communication end.

In step 602, if there is no the identifier that is stored (that is, there is no active terminal), the controller 140 deactivates the UICC 100 according to a deactivation procedure in step 604.

If there is the identifier that is stored (that is, there is active terminal), the controller 140 keeps a communication connection between a corresponding communication modem 120, 130 and the UICC 100.

As set forth above, the communication modem 120, 130 performs inter-operation with the controller 140 when the communication modem 120, 130 is provided with initial information and the communication authority from the controller 140, and directly communicates with the UICC 100 after being endowed with the communication authority. Even if any communication modem 120, 130 includes the controller 140 in a complex terminal, any communication modem to be endowed with the communication authority communicates with the UICC 100 without interrupting another communication modem that performs a role as the controller 140. Therefore, an unnecessary power is not wasted Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating with a Universal IC Card (UICC) in a portable terminal comprising at least two communication modems, the method comprising:
    obtaining, by a controller, a control information through a UICC initialization and providing a corresponding communication modem with the control information;
    requesting, by the corresponding communication modem, a communication authority based on the control information and obtaining the communication authority from the controller; and
    connecting, by a selector, the corresponding communication modem to the UICC, while the controller provides the corresponding communication modem with the communication authority.

2. The method of claim 1, wherein the control information comprises at least one of: an Answer to Reset information; a Protocol and Parameter Selection information; and a voltage information.

3. The method of claim 1, further comprising returning, by the corresponding communication modem, the communication authority to the controller;
    providing, by the controller, another communication modem with the returned communication authority, if the another communication modem requests the communication authority; and
    connecting, by the selector, the another communication modem to the UICC,
    wherein a link of the another communication modem and the UICC is connected through a data path and a clock path.

4. The method of claim 1, further comprising requesting, by the corresponding communication modem, a communication end to the controller;
    storing, by the controller, a number of communication modem Identifiers (ID);
    removing, by the controller, an Identifier (ID) of the corresponding communication modem; and
    deactivating, by the controller, the UICC, when no communication modem IDs are stored.

5. The method of claim 1, wherein a link of the corresponding communication modem and the UICC is connected through a data path and a clock path, and a link of the controller and the UICC are connected through at least one of: a power path; a clock path; a data path; and a reset path.

6. The method of claim 1, further comprising queuing, by the controller, the request for the communication authority, when another communication modem requests the communication authority while the corresponding communication modem communicates with the UICC; and providing, by the controller, the another communication modem with the communication authority, when the corresponding communication modem at least one of: returns the communication authority; and ends communicating with the UICC.

7. The method of claim 6, further comprising cancelling, by the corresponding communication modem, the queued communication authority.

8. The method of claim 1, further comprising, storing, by the controller, an identifier of the corresponding communication modem, when proving the control information with the corresponding communication modem.

9. An apparatus for communicating with a Universal IC Card (UICC) in a portable terminal comprising at least two communication modems, the apparatus comprising:

a controller configured to obtain a control information through a UICC initialization and provide a corresponding communication modem with the control information;

the corresponding communication modem configured to request a communication authority based on the control information and obtain the communication authority from the controller; and a selector configured to connect the corresponding communication modem to the UICC while the controller provides the corresponding communication modem with the communication authority.

10. The apparatus of claim 9, wherein the control information comprises at least one of: an Answer to Reset information; a Protocol and Parameter Selection information; and a voltage information.

11. The apparatus of claim 9, wherein the corresponding communication modem returns the communication authority to the controller;

the controller provides another communication modem with the returned communication authority if the another communication modem requests the communication authority; and the selector connects the another communication modem to the UICC, wherein a link of the another communication modem and the UICC is connected through a data path and a clock path.

12. The apparatus of claim 9, wherein the corresponding communication modem requests a communication end to the controller;

the controller stores a number of communication modem Identifiers (ID);

the controller removes an Identifier (ID) of the corresponding communication modem; and the controller deactivates the UICC when no communication modem IDs are stored.

13. The apparatus of claim 9, wherein a link of the corresponding communication modem and the UICC is connected through a data path and a clock path, and a link of the controller and the UICC is connected through a power path, the clock path, the data path and a reset path.

14. The apparatus of claim 9, wherein the controller queues the request for the communication authority when another communication modem requests the communication authority while the corresponding communication modem communicates with the UICC; and the controller provides the another communication modem with the communication authority when the corresponding communication modem returns the communication authority or the corresponding communication modem ends communicating with the UICC.

15. The apparatus of claim 14, wherein the corresponding communication modem cancels the queued communication authority.

16. The apparatus of claim 9, wherein the controller stores an identifier of the corresponding communication modem, when proving the control information with the corresponding communication modem.

17. An apparatus for controlling a Universal IC Card (UICC) in a portable terminal comprising at least two communication modems, the apparatus comprising:

an interface unit configured to communicate between at least two communication modems and a controller; and the controller configured to control a communication between the at least two communication modems and a UICC through a selector by giving and taking a communication authority to the at least two communication modems.

18. The apparatus of claim 17, wherein a link between the controller and the UICC is connected using a power path, a clock path, a data path and a reset path.

19. The apparatus of claim 17, wherein the selector connects the at least one communication modem to the UICC using a clock path and a data path.

20. The apparatus of claim 17, wherein while one of the at least two communication modems is connected to the UICC, the UICC is maintained to be a clock stop mode to keep a steady state if the other of the at least two communication modems is to be connected to the UICC through a MUX.

21. The apparatus of claim 17, wherein the at least one communication modem requests an Answer to Reset information (ATR) and a Protocol and Parameter Selection (PPS) information to the controller in order to initiate the UICC; and the controller obtains and stores ATR information and PPS information through a cold reset and a warm reset.

22. The apparatus of claim 21, wherein the controller stores an identifier of the communication modem that requests a UICC initialization.

23. The apparatus of claim 17, wherein the controller determines that the UICC is connected to another communication modem to provide with the at least one communication modem;

the controller sets occupation state when the UICC is not connected by the other communication modem;

a link between a corresponding communication modem and the UICC is connected through the selector using a data path and a clock path; and the controller informs the communication authority of the corresponding communication modem.

24. The apparatus of claim 23, wherein the controller queues the communication authority request of the corresponding communication modem when the UICC is connected by another communication modem.

25. The apparatus of claim 17, wherein the controller determines whether the communication authority request queues from the controller when a corresponding communication modem returns the communication authority; and the controller connects the corresponding modem to the UICC by controlling the selector when the communication authority request queues and informs the providing communication authority of the corresponding communication modem.

26. The apparatus of claim 25, wherein the controller keeps an occupation state of the UICC as an unoccupied state when the communication authority request does not queue.

27. The apparatus of claim 17, wherein for the communication end between a corresponding communication modem and the UICC,
the controller removes an identifier of a communication modem that requests that the communication end;
the controller deactivates the UICC if another communication modem does not wait to communicate with the UICC.

28. The apparatus of claim 27, wherein the controller controls to connect between the other communication modem and the UICC, if the anther communication modem waits to communicate with the UICC.

29. A method for controlling a Universal IC Card (UICC) in a portable terminal comprising at least two communication modems, the method comprising:
receiving, by a controller, a request message for a communication authority from at least two communication modems;
transmitting, by the controller, the communication authority to the at least two communication modems; and
controlling, by the controller, a communication between the at least two communication modems and a UICC through a selector.

30. The method of claim 29, wherein a link between the controller and the UICC is connected using at least one of: a power path, a clock path, a data path and a reset path.

31. The method of claim 29, wherein the selector connects the at least one communication modem to the UICC using a clock path and a data path.

32. The method of claim 29, wherein if another communication modem is to be connected to the UICC through a MUX while a corresponding communication modem is connected to the UICC, the UICC is maintained to be a clock stop mode to keep a steady state.

33. The method of claim 29, further comprising, requesting, by the at least one communication modem, an Answer to Reset information (ATR) and a Protocol and Parameter Selection (PPS) information to the controller in order to initiate the UICC to controller; and
obtaining and storing, by the controller, the ATR information and the PPS information through a cold reset and a warm reset.

34. The method of claim 29, further comprising, storing an identifier of a communication modem that requests a UICC initialization.

35. The method of claim 29, further comprising determining, by the controller, whether the communication authority request queues, when the at least two communication modem returns the communication authority to the controller;
connecting, by the controller, a corresponding modem to the UICC by controlling the selector if the communication authority queues; and
informing, by the controller, the communication authority of the corresponding communication modem.

36. The method of claim 29, further comprising, for the communication end between a corresponding and the UICC,
removing, by the controller, an identifier of a communication modem that requests the communication termination;
deactivating, by the controller, the UICC if another communication modem does not wait to communicate with the UICC.

* * * * *